(12) United States Patent
Sonoda

(10) Patent No.: US 11,131,352 B2
(45) Date of Patent: Sep. 28, 2021

(54) BRAKING DEVICE FOR VEHICLE

(71) Applicant: HONDA MOTOR CO., LTD., Tokyo (JP)

(72) Inventor: Kazuki Sonoda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 89 days.

(21) Appl. No.: 16/582,282

(22) Filed: Sep. 25, 2019

(65) Prior Publication Data

US 2020/0102991 A1 Apr. 2, 2020

(30) Foreign Application Priority Data

Sep. 28, 2018 (JP) .............................. JP2018-184910

(51) Int. Cl.
*F16D 65/00* (2006.01)
*F16D 65/847* (2006.01)
*B60T 5/00* (2006.01)

(52) U.S. Cl.
CPC ............ *F16D 65/0081* (2013.01); *B60T 5/00* (2013.01); *F16D 65/0087* (2013.01); *F16D 65/847* (2013.01)

(58) Field of Classification Search
CPC ............. F16D 65/0081; F16D 65/0087; F16D 65/847; B60T 5/00
See application file for complete search history.

(56) References Cited

U.S. PATENT DOCUMENTS

| 4,005,768 | A | | 2/1977 | Bubnash et al. |
| 4,257,498 | A | * | 3/1981 | Nogami ................... F16D 55/22 188/218 A |
| 4,326,610 | A | * | 4/1982 | Mouza .................... F16D 53/00 188/218 A |
| 5,293,967 | A | * | 3/1994 | Siegrist ................... F16D 53/00 188/218 A |

(Continued)

FOREIGN PATENT DOCUMENTS

| CN | 205190579 U | * | 4/2016 |
| CN | 205503816 U | * | 8/2016 |

(Continued)

OTHER PUBLICATIONS

Translation of Chinese Patent No. CN 205841576 obtained from website: https://worldwide.espacenet.com on Feb. 16, 2021.*

(Continued)

*Primary Examiner* — Pamela Rodriguez
(74) *Attorney, Agent, or Firm* — Rankin, Hill & Clark LLP

(57) ABSTRACT

A braking device for vehicle comprises a splash guard which is a plate-like member arranged to closely face a friction portion of a circular disk-shaped rotor with a wheel axis as a rotation center so as to be mounted on a knuckle, wherein the splash guard includes a fixing plate fixed to the knuckle, a wall with holes extending from the fixing plate towards the rotor, and a plurality of cooling holes which are through-holes passing through the wall with holes, wherein the plurality of cooling holes are open along the wall with holes, and an opening area of each cooling hole formed on an upper side of the wheel axis is set to be smaller than an opening area of a cooling hole formed on a lower side of the wheel axis.

11 Claims, 4 Drawing Sheets

(56) References Cited

U.S. PATENT DOCUMENTS

| | | | |
|---|---|---|---|
| 8,365,883 B2* | 2/2013 | Matsubayashi | B62J 15/00 188/218 A |
| 2020/0102992 A1* | 4/2020 | Miyake | F16D 65/0081 |
| 2020/0116221 A1* | 4/2020 | Ogawa | F16D 55/00 |

FOREIGN PATENT DOCUMENTS

| | | |
|---|---|---|
| CN | 205841576 U | 12/2016 |
| CN | 206374810 U | 8/2017 |
| CN | 206468716 U | 9/2017 |
| CN | 206904113 U | 1/2018 |
| CN | 207191180 U | 4/2018 |
| CN | 208221426 U | 12/2018 |
| DE | 102014213156 A1 | 1/2016 |
| EP | 1577578 A1 | 9/2005 |
| JP | S62-204044 U | 12/1987 |
| JP | 2002-276698 A | 9/2002 |

OTHER PUBLICATIONS

Office Action received in corresponding CN application No. 201910933554.X dated Nov. 18, 2020 with English translation (19 pages).

* cited by examiner

BRAKING DEVICE FOR VEHICLE

CROSS-REFERENCE TO RELATED APPLICATIONS

This application is based upon and claims the benefit of priority from Japanese Patent Application No. 2018-184910 filed on Sep. 28, 2018; the entire contents of which are incorporated herein by reference.

TECHNICAL FIELD

The present invention relates to a braking device for a vehicle which performs braking of a vehicle.

BACKGROUND ART

As a braking device for a vehicle, a disk brake is widely employed, which performs braking by sandwiching a rotor of a circular disk-shaped plate with pads (friction materials) on both plate surfaces of the rotor which rotates together with a wheel. However, in such a disk brake, when dust, gravel, or muddy water and the like is caught between the rotor and the pads, and when braking is carried out in that state, there may be a risk that a sufficient braking force may not be obtained.

Thus, in order to prevent any foreign matter from entering between the rotor and the pads, the rotor is conventionally covered with a splash guard.

For example, in a braking device for a vehicle, as disclosed in Japanese open-laid patent application no. 2002-276698, a splash guard including holes for fixation and holes for the cables etc. is disclosed.

Further, in a braking device for a vehicle, as disclosed in Japanese open-laid utility patent application no. S62-204044, a splash guard provided with embossing for reinforcement is disclosed.

SUMMARY OF INVENTION

Technical Problem

When the rotor is constructed to be covered with a splash guard, there is a risk of insufficient cooling due to heat produced during braking.

Therefore, conventionally, cooling holes are formed in the splash guard. However, by forming the cooling holes, there arises a new problem that it is difficult to eliminate the foreign matters entered through the cooling holes between the splash guard and the rotor to an outside.

The present invention is created considering the above problem and aims at providing a braking device for a vehicle, including a splash guard which suppresses foreign matters from entering between the splash guard and the rotor while exerting sufficient cooling performance.

Solution to Problem

In order to solve the above problem, a braking device according to the present invention includes a splash guard which is a plate-like member arranged to closely face a friction portion of a circular disk-shaped rotor with a wheel axis as a rotation center so as to be mounted on the knuckle, wherein the splash guard includes a fixing plate fixed to the knuckle, a wall with holes extending from the fixing plate towards the rotor, and a plurality of cooling holes which are through-holes passing through the wall with holes, wherein the plurality of cooling holes are open along the wall with holes, and an opening area of each cooling hole formed on an upper side of the wheel axis is set to be smaller than an opening area of the cooling hole formed on a lower side of the wheel axis.

Advantageous Effect of the Invention

According to the present invention, a braking device including a splash guard, which suppresses foreign matters from entering between the splash guard and the rotor, can be provided.

DESCRIPTION OF EMBODIMENTS

An embodiment according to the present invention will be described in detail referring to the figures. It should be noted that, in the following explanation, a same reference number is given to a same element, and accordingly repeating explanations are omitted.

Figure 1:
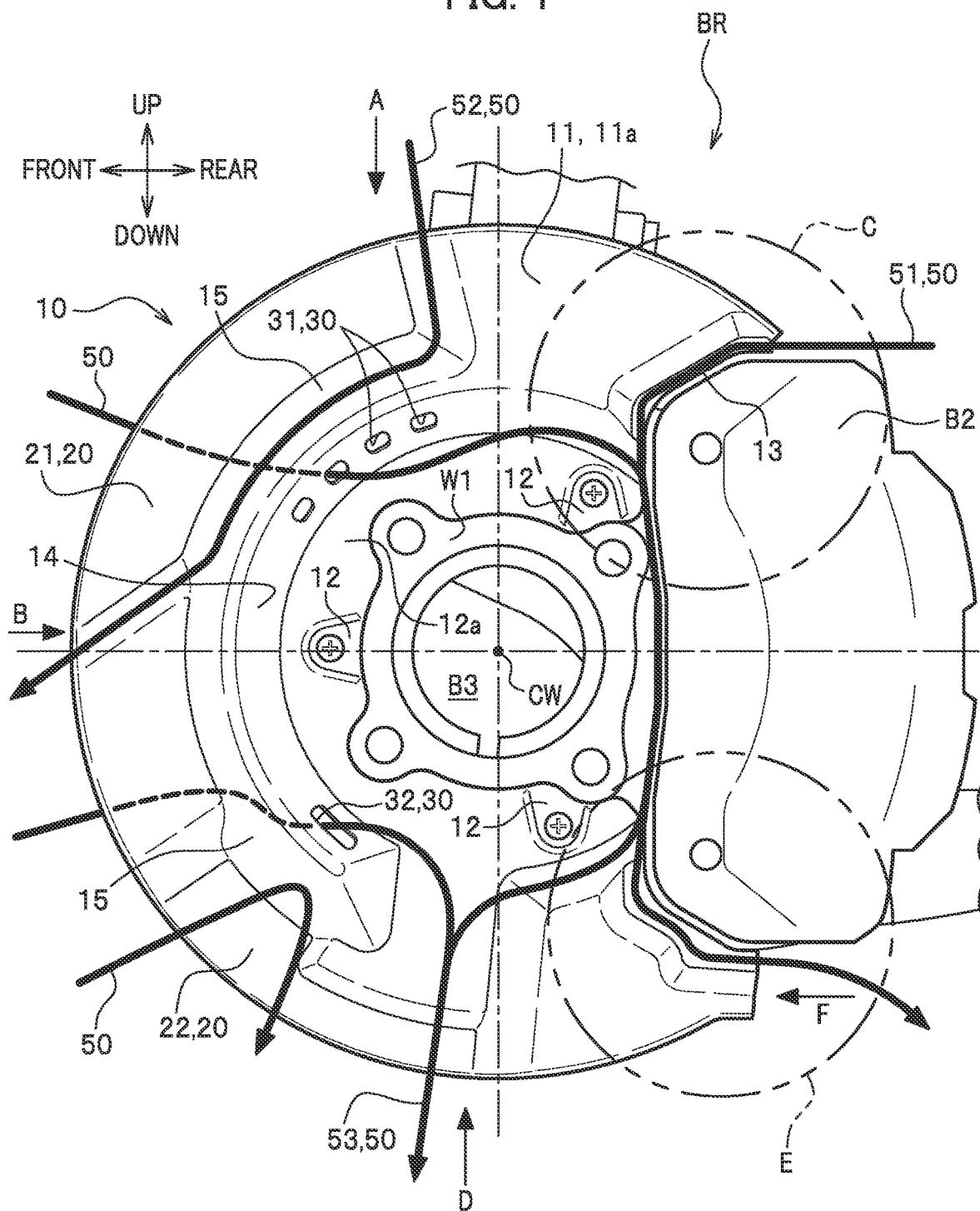
FIG. 1 shows a front view of a braking device for a vehicle according to an embodiment, in which a splash guard is assembled to a knuckle.

A disk brake BR (a braking device for a vehicle) according to the present embodiment is configured for braking a front wheel (not shown in the figure) which is a steering wheel, and is attached to a knuckle (of a vehicle body) on a side of the front wheel, as illustrated in FIG. 1.

Further, the disk brake BR according to the present embodiment includes a rotor B1, a caliper B2 and, in addition, a splash guard 10.

In the disk brake BR, the caliper B2 is activated by driver's braking operation. Then, as the caliper B2 is activated, braking pads (not shown in the figure) arranged to face each other within the caliper B2 are pressed onto the rotor B1 which rotates together with the wheel, for braking.

With the disk brake BR configured as above, while the vehicle is travelling, foreign matters such as dust, gravel, and muddy water, etc. are whirled up around the wheel.

Therefore, the foreign matters, which have been whirled up, occasionally may be put on the rotor B1, or may enter into a gap between the rotor B1 and the braking pads.

Further, if braking is carried out in a state that a foreign matter is sandwiched between the rotor B1 and the braking pads, there is a risk that a desired braking force may not be obtained, and, in addition, there is a risk that the rotor B1 and the braking pads may be damaged.

Further, when a hub bearing (not shown in the figure) which supports the wheel is splashed with muddy water, due to various particles contained in the muddy water, there is a risk that wearing of the hub bearing may be accelerated.

Therefore, in the disk brake BR (a brake device for a vehicle) according to the present embodiment, a splash guard 10 is provided to suppress the foreign particles to enter into the gap between the rotor B1 and the braking pads.

Next, configurations of respective parts of the disk brake BR will be explained (refer to FIG. 1).

The rotor B1 (refer to FIGS. 2, 3) is pivotably supported via the hub bearing, by which the rotor can freely rotate together with the front wheel (vehicle wheel) with respect to the knuckle (vehicle body). Further, the rotor B1 has a substantially circular disk-shape centered around a wheel axis CW of the front wheel (vehicle wheel) and is arranged facing parallel to a rotational plane of the front wheel (vehicle wheel).

The rotor B1 includes a rotor supporting portion and a friction portion B1b.

The rotor supporting portion constitutes a center portion of the substantially circular disk-shaped rotor B1.

The friction portion B1b has an annular shape and constitutes an outer circumferential portion of the substantially circular disk-shaped rotor B1.

In other words, the friction portion B1b has the same center as the rotor supporting portion to be integrally formed therewith on an outer side in the radial direction of the rotor supporting portion.

The caliper B2 arranged on a portion of the knuckle which faces a rear edge of the rotor B1 (refer to FIG. 1).

Further, the caliper B2 has a substantially U-shape in a cross-section and is mounted on the knuckle to accommodate the friction portion B1b in an inner recess having a U-shape so as to sandwich the friction portion B1b.

Namely, the caliper B2 is arranged to have the friction portion in a direction of plate thickness.

Further, the braking pads are arranged in the caliper B2, allowing the pads to move onto the friction portion B1b.

Thus, by a braking operation of the driver, the braking pads are pressed against the friction surface B1c of the friction portion B1b, through which a friction force is generated between the braking pads and the friction portion B1b. When the braking pads are pressed against the friction surface B1c of the friction portion B1b, the friction force works as a braking force.

The splash guard 10 is arranged between the rotor B1 and the knuckle W1 and is fixed to the knuckle W1, covering the rotor B1 from an inner side in the vehicle body width direction.

Further, the splash guard 10 includes a guard main body 11, fixing portions 12, a cutout portion 13, a wall with holes 14, cooling holes 30, an offset wall 15, and an offset portion 20.

The guard main body 11 defines an outline of the splash guard 10 and is configured with a member of a circular disk-shape which follows the outline of the rotor B1.

The fixing portions 12 having a substantially circular shape are configured to fix the splash guard 10 to the knuckle W1, at three positions of a fixing plate 12a which faces to the rotor supporting portion of the rotor B1.

In the fixing portion 12, a through hole passing through the fixing plate 12a is formed. The splash guard 10 is fixed to the knuckle by screwing a screw, which passes through the fixing portion 12, into a female screw formed on the knuckle W1.

It should be noted that, regarding the means for fixing the fixing portion 12 to the knuckle W1, any means can be appropriately employed, as long as the means does not hinder the rotation of the rotor B1 and wheel and does not hinder the movement of the caliper B2.

Further, a space is formed between the fixing plate 12a and the rotor B1, referred to as a fixed space B3 (refer to FIG. 1). In addition, the fixed space B3 functions as an elimination route 50 for eliminating the foreign matters to an outside. It should be noted that the fixed space B3 is communicated with the cutout portion 13.

The cutout portion 13 is formed in a portion of the guard main body 11 which faces the caliper B2 when the splash guard 10 is assembled to the knuckle W1. Further, the cutout portion 13 is cut out following an outline of the caliper B2 (refer to FIG. 1).

In addition, the splash guard 10, receiving the caliper B2 in the cutout portion 13, is arranged close to and to face the friction surface B1c of the friction portion B1b so as to be overlapped therewith.

Further, a region, which is formed by the cutout portion 13, the outer circumferential surface of the caliper B2, and the friction surface B1c of the rotor B1 functions as an elimination route 50 (a second elimination route 51).

The wall with holes 14 is curved in an arc shape along an outer circumferential edge of the fixing plate 12a to extend from the fixing plate 12a towards the rotor B1.

Further, the wall with holes 14 connects the fixing plate 12a to the guard main body 11.

In addition, the wall with holes 14 discontinues at a lower side of the wheel axis CW.

Next, a description will be given of the cooling holes 30 (refer to FIG. 1).

The cooling holes 30 are configured with five through-holes which pass through the wall with holes 14, and all the cooling holes 30 are formed on a front side relative to the wheel axis CW.

Further, all the cooling holes 30 are opened in the radial direction and are communicated with the fixed space B3.

In addition, the cooling holes 30 includes upper cooling holes 31 and a lower cooling hole 32.

The upper cooling holes 31 are configured with four cooling holes, which are arranged on the upper side relative to the wheel axis CW. Further, the upper cooling holes 31 are formed such that an opening area of each cooling hole is smaller than an opening area of the lower cooling hole 32.

The lower cooling hole 32 is configured with one remaining cooling hole 30, which is formed on the lower side relative to the wheel axis CW.

The offset wall 15 is curved in an arc shape to extend from the guard main body 11 so as to be arranged across the cooling holes 30 on an outer side in the radial direction of the cooling holes 30 relative to the wheel axis CW as a center axis.

Further, the offset wall 15 connects the guard main body 11 to the offset portion 20.

Further, the offset wall 15 discontinues at a portion which overlaps in the radial direction with a portion of the wall with holes 14, where the wall with holes 14 discontinues at a lower side of the wheel axis CW. In addition, the portion of the offset wall 15, where the offset wall 15 discontinues at the lower side of the wheel axis CW and the portion of the wall with holes 14, where the wall with holes 14 discontinues, are connected together.

Next, a description will be given of the offset portion 20 (refer to FIG. 1).

The offset portion 20 is a portion which is offset in a direction along which a distance between the splash guard 10 and the friction surface B1c of the rotor B1 becomes larger (refer to FIG. 1).

Further, the offset portion 20 is configured as a recessed portion having a substantially trapezoidal cross section which is narrowed as a distance between the plate surface 11a of the guard main body 11 and the friction portion B1b becomes larger (refer to FIGS. 2-7).

Figure 2:
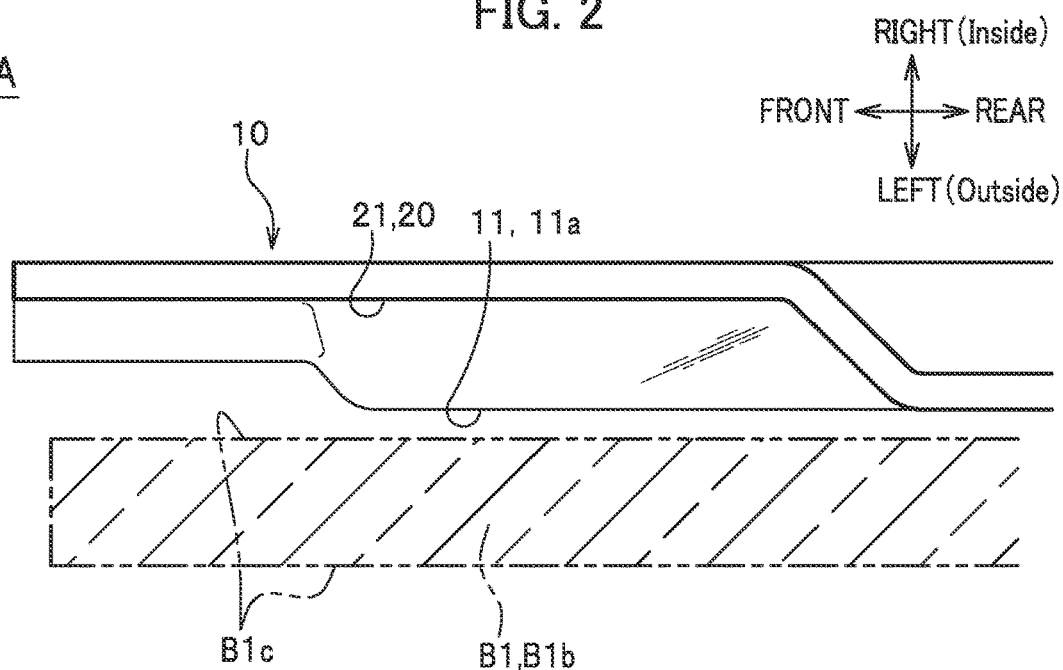
FIG. 2 is an enlarged view, seen from a direction A in FIG. 1.
Figure 3:
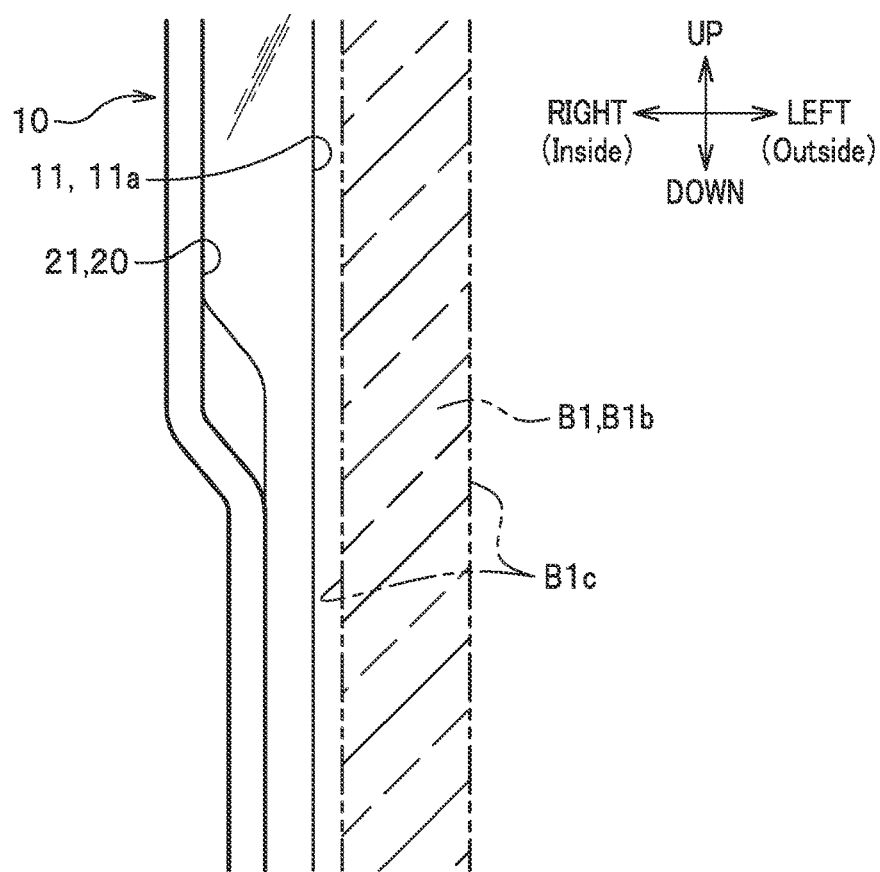
FIG. 3 is an enlarged view, seen from a direction B in FIG. 1.
Figure 4:
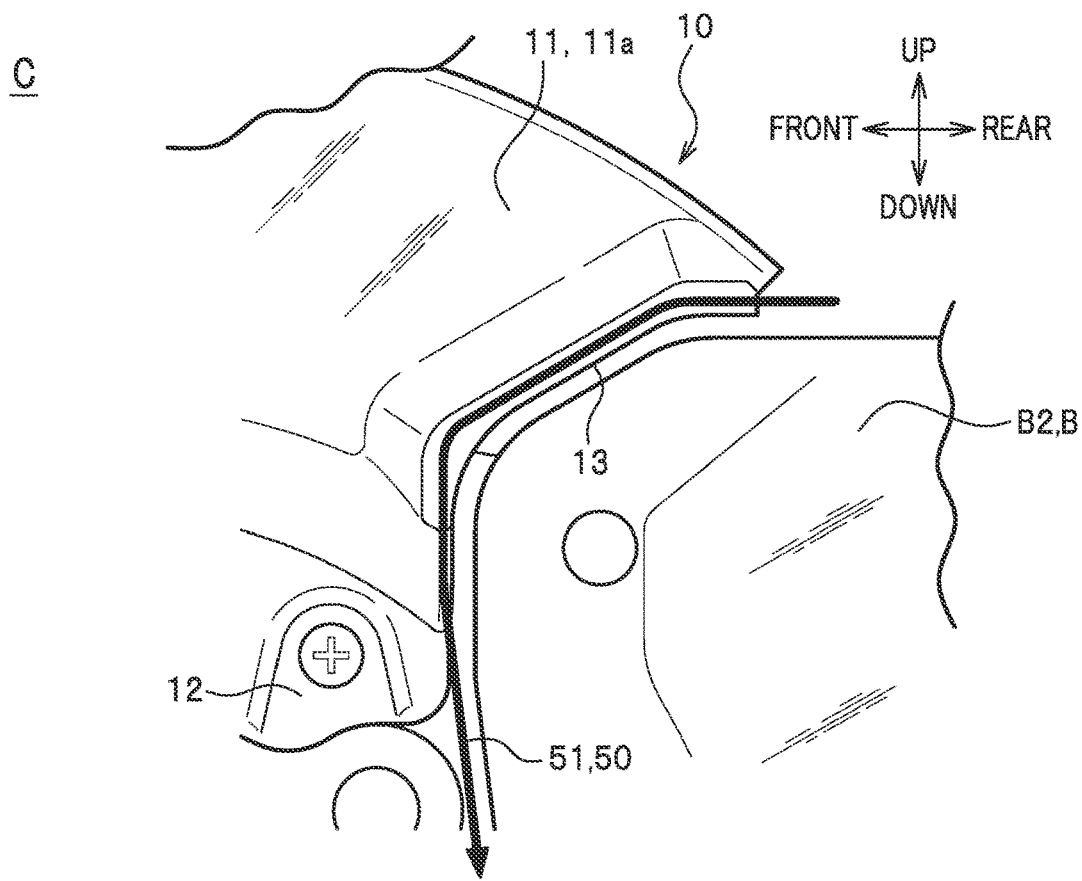
FIG. 4 is an enlarged view of a portion C of FIG. 1.
Figure 5:
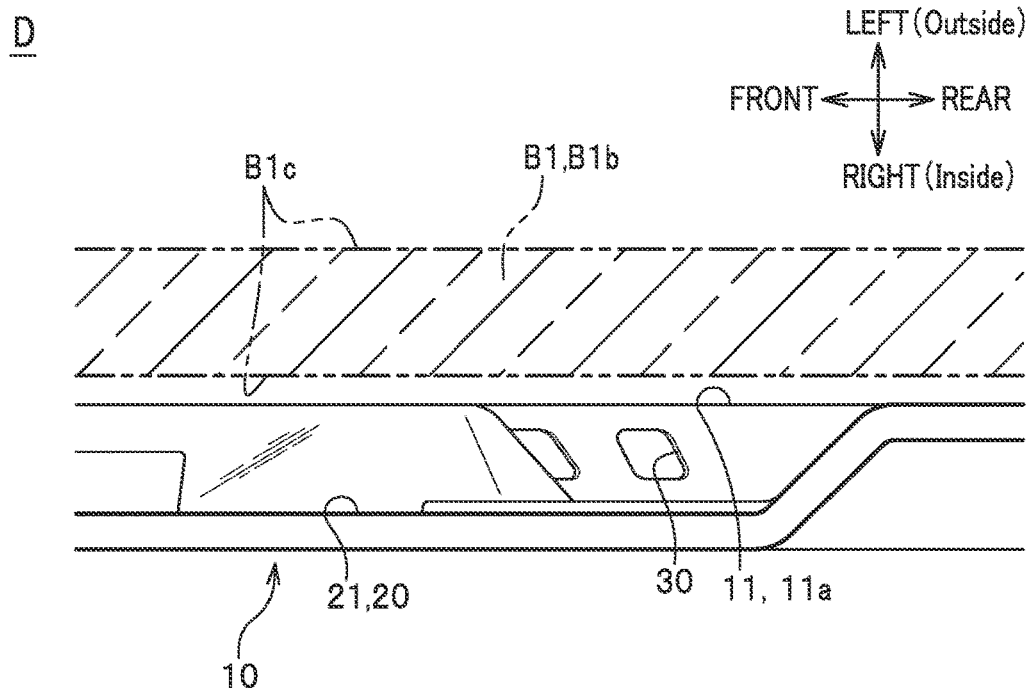
FIG. 5 is an enlarged view, seen from a direction D in FIG. 1.
Figure 6:
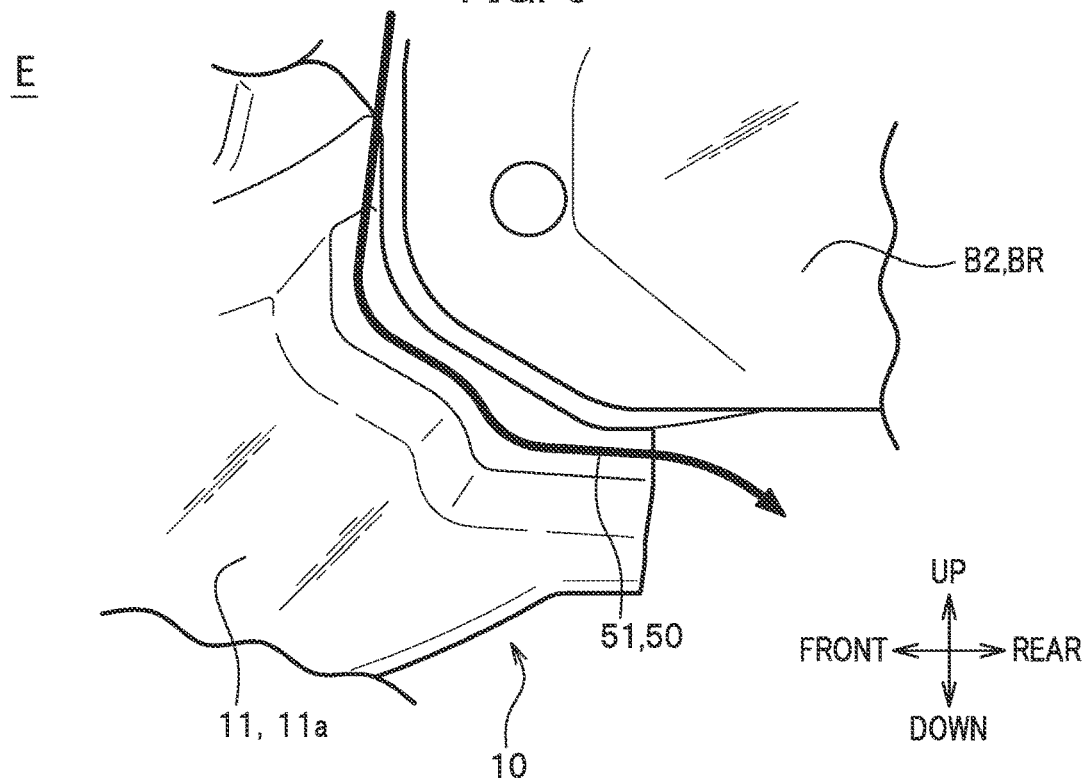
FIG. 6 is an enlarged view of a portion E of FIG. 1.
Figure 7:
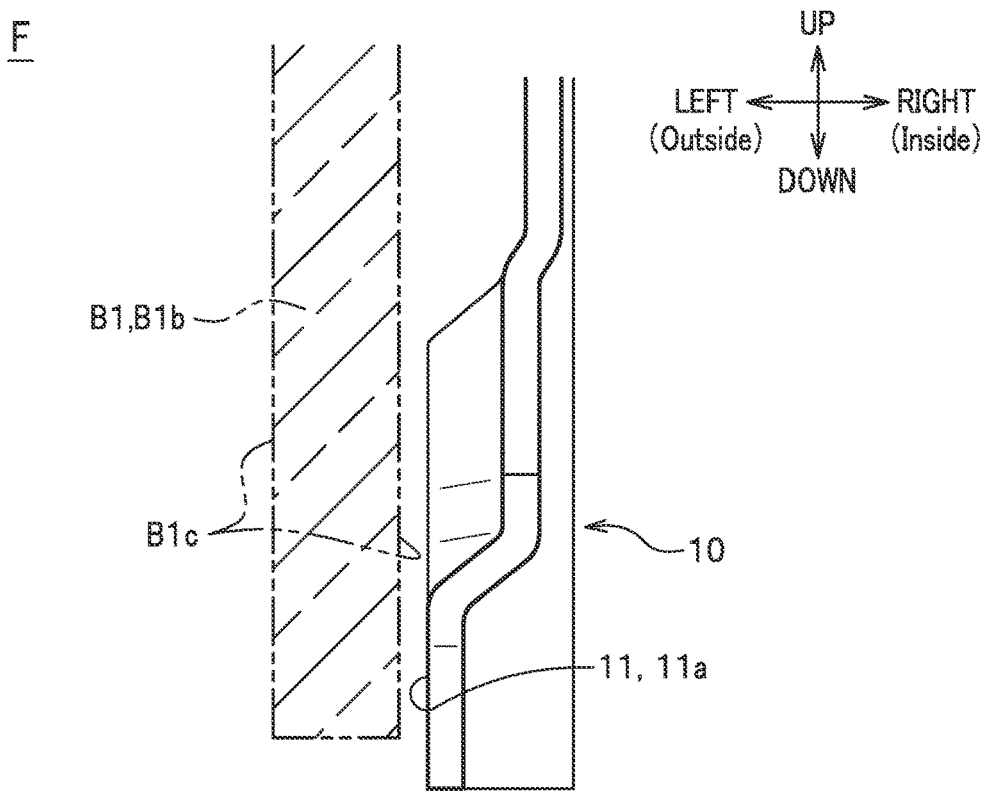
FIG. 7 is an enlarged view, seen from a direction F in FIG. 1.

Further, the offset portion 20 includes an upper offset portion 21 and a lower offset portion 22 (refer to FIGS. 1, 2).

The upper offset portion 21 is formed on the guard main body 11 at a peripheral portion positioned on the front side relative to the wheel axis CW and on the upper side relative to the wheel axis CW.

It should be noted that the upper offset portion 21 functions as the elimination route 50 (first elimination route 52), through which the foreign matters entered between the splash guard 10 and the rotor B1 are eliminated (refer to FIG. 1).

The lower offset portion 22 is formed on the guard main body 11 at the front side relative to the wheel axis CW and at a lower peripheral portion relative to the wheel axis CW.

It should be noted that the lower offset portion 22 (an outer-diameter side of the offset wall) is communicated with the cutout portion 13 via the fixed space B3 (an inner-diameter side of the offset wall).

Further, the lower offset portion 22 functions as the elimination route 50 (third elimination route 53), through which the foreign matters entered between the splash guard 10 and the rotor B1 are eliminated (refer to FIG. 1).

Next, a description will be given of the function of the splash guard 10 (refer to FIG. 1).

When a foreign matter strikes on the wall with holes 14 in such a way that the foreign matter falls down from the upper side or is splatted from the ground and so on, the foreign matter is repelled to the front side directly.

When a foreign matter enters into the upper offset portion 21 in such a way that the foreign matter falls down from the upper side or is splatted from the front side and so on, the foreign matter will be eliminated through the first elimination route 52 (along the offset wall 15) towards the front side.

When a foreign matter strikes on the caliper B2 in such a way that the foreign matter falls down from the upper side or is splatted from the ground and so on, the foreign matter will be eliminated through the second elimination route 51 towards the rear side of the caliper B2.

Thus, there are two routes for eliminating the foreign matter, when the foreign matter passes through the upper cooling holes 31 and enters into the fixed space B3 in such a way that the foreign matter falls down from the upper side or is splatted from the front side and so on.

In the first route, the foreign matter which passes through the upper cooling holes 31 is eliminated through the fixed space B3 and the second eliminating route towards the rear side of the caliper B2.

In the second route, the foreign matter which passes through the upper cooling holes 31 is eliminated through the fixed space B3 and the lower offset portion 22 downwards to the outside.

When the foreign matter enters into the lower offset portion 22 in such a way that the foreign matter is splatted from the ground and so on, the foreign matter is repelled from the offset wall 15 and is eliminated downwards.

When the foreign matter passes through the lower cooling hole 32 and enters into the fixed space B3 in such a way that the foreign matter is splatted from the ground and so on, the foreign matter is eliminated from the fixed space B3 through the lower offset portion 22 downwards to the outside.

Next, a description will be given of the effect of the disk brake (a braking device for a vehicle) according to the present embodiment.

In the present embodiment, since the upper cooling holes 31 are formed at higher positions than the lower cooling hole 32 relative to the ground, an opening area of each upper cooling hole is set to be smaller than an opening area of the lower cooling hole 32. Further, a plurality of upper cooling holes 31 are formed.

This is because the foreign matter splatted from the ground flies higher when a particle size thereof is smaller and flies lower when the particle size thereof is larger, and therefore the opening area is set according to a particle size of the splatted foreign matter.

With this configuration, along with exerting a sufficient cooling performance, it is possible to suppress entrance of the foreign matters.

In the present embodiment, the offset wall 15 extends across the cooling holes (upper cooling holes 31, lower cooling hole 32).

With this configuration, since the foreign matters to the cooling holes 30 are blocked by the offset wall 15, it is possible to further suppress the foreign matters from entering through the cooling holes 30.

In the present embodiment, the offset portion 20 (upper offset portion 21, lower offset portion 22) is provided at the radially outer side of the cooling holes 30 (upper cooling holes 31, lower cooling hole 32), having the offset wall 15 therebetween. Further, the offset portion 20 constitutes the eliminating route 50 (first eliminating route 52, third eliminating route 53).

With the configuration described above, the foreign matters to the cooling holes 30 are blocked by the offset wall 15 and are eliminated from the offset portion 20 to the outside.

As a result, it is possible to further suppress the entrance of the foreign matters.

In the present embodiment, the wall with holes 14 discontinues at the lower side of the wheel axis CW. Due to this configuration, the fixed space B3 (inner-diameter side of the offset wall) is communicated with the lower offset portion 22 (outer-diameter side of the offset wall).

As a result, the foreign matters which entered through the cooling holes 30 can be quickly eliminated to the outside.

In the present embodiment, the region, which is formed by the cutout portion 13, the outer circumferential surface of the caliper B2 and the friction surface B1c of the rotor B1, configures the elimination route 50 (the second elimination route 51) for eliminating the foreign matters.

As a result, the foreign matters which entered between the cutout portion 13 and the caliper B2 can be quickly eliminated to the outside.

Although the invention has been described above by reference to certain embodiments of the invention, the invention is not limited to the embodiments described above. Modifications and variations of the embodiments described above will occur to those skilled in the art, in light of the above teachings. The scope of the invention defined with reference to the following claims.

The invention claimed is:

1. A braking device for a vehicle comprising:
a splash guard which is a plate-like member arranged to closely face a friction portion of a circular disk-shaped rotor with a wheel axis as a rotation center so as to be mounted on a knuckle,
wherein the splash guard includes
a fixing plate fixed to the knuckle,
a wall with holes extending from the fixing plate towards the rotor, and
a plurality of cooling holes which are through-holes passing through the wall with holes, wherein
the plurality of cooling holes are open along the wall with holes, and
an opening area of each cooling hole formed on an upper side of the wheel axis is set to be smaller than an opening area of the cooling hole formed on a lower side of the wheel axis.

2. The braking device for the vehicle according to claim 1, wherein
the splash guard includes an offset wall extending across the cooling holes on an outer side in a radial direction of the cooling holes centered around the wheel axis.

3. The braking device for the vehicle according to claim 2, wherein
the splash guard includes an offset portion offset by the offset wall in a direction along which a distance between the splash guard and the friction portion becomes larger at a peripheral portion positioned at an outer side in the radial direction of the cooling holes.

4. The braking device for the vehicle according to claim 3, wherein
the wall with holes discontinues at a lower side of the wheel axis, and the offset wall discontinues at a portion which overlaps in a radial direction with a portion of the wall with holes, where the wall with holes discontinues.

5. The braking device for the vehicle according to claim 2, wherein
the wall with holes discontinues at a lower side of the wheel axis, and the offset wall discontinues at a portion which overlaps in the radial direction with a portion of the wall with holes, where the wall with holes discontinues.

6. A braking device for a vehicle comprising:
a splash guard which is a plate-like member arranged to closely face a friction portion of a circular disk-shaped rotor with a wheel axis as a rotation center so as to be mounted on a knuckle,
wherein the splash guard includes
an offset wall arranged at a peripheral portion positioned at a front side relative to the wheel axis to extend in a direction along which a distance to the friction portion becomes larger, and
an offset portion offset by the offset wall in a direction along which a distance between the splash guard and the friction portion becomes larger,
wherein
the offset portion constitutes a first elimination route.

7. The braking device for the vehicle according to claim 6, wherein
the splash guard includes a second elimination route which is formed with a friction surface of the rotor, a circumferential surface of a caliper arranged to have the friction portion of the rotor in a direction of plate thickness, and a cutout portion cut out following an outline of the caliper.

8. The braking device for the vehicle according to claim 7, wherein
the offset wall is curved in an arc shape centered around the wheel axis to be discontinued at a lower side of the wheel axis, and the splash guard includes a third elimination route in which an outer-diameter side of the offset wall and the cutout portion communicate to each other via an inner-diameter side of the offset wall.

9. The braking device for the vehicle according to claim 8, wherein
the splash guard comprises
a fixing plate fixed to the knuckle,
a wall with holes extending from the fixing plate towards the rotor, and
a plurality of cooling holes which are through-holes passing through the wall with holes.

10. The braking device for the vehicle according to claim 7, wherein
the splash guard comprises
a fixing plate fixed to the knuckle,
a wall with holes extending from the fixing plate towards the rotor, and
a plurality of cooling holes which are through-holes passing through the wall with holes.

11. The braking device for the vehicle according to claim 6, wherein
the splash guard comprises
a fixing plate fixed to the knuckle,
a wall with holes extending from the fixing plate towards the rotor, and
a plurality of cooling holes which are through-holes passing through the wall with holes.

* * * * *